US007912046B2

(12) United States Patent
Li et al.

(10) Patent No.: US 7,912,046 B2
(45) Date of Patent: Mar. 22, 2011

(54) AUTOMATED NAT TRAVERSAL FOR PEER-TO-PEER NETWORKS

(75) Inventors: Jin Li, Sammamish, WA (US); Li-Wei He, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1388 days.

(21) Appl. No.: 11/056,550

(22) Filed: Feb. 11, 2005

(65) Prior Publication Data

US 2006/0182100 A1 Aug. 17, 2006

(51) Int. Cl.
*H04L 12/28* (2006.01)
*G06F 15/16* (2006.01)
(52) U.S. Cl. .......................... 370/389; 709/227
(58) Field of Classification Search .................. None
See application file for complete search history.

(56) References Cited

U.S. PATENT DOCUMENTS

| | | | | |
|---|---|---|---|---|
| 6,661,799 | B1* | 12/2003 | Molitor | 370/401 |
| 7,302,496 | B1* | 11/2007 | Metzger | 709/245 |
| 7,328,280 | B2* | 2/2008 | Takeda et al. | 709/245 |
| 2003/0067874 | A1* | 4/2003 | See et al. | 370/230.1 |
| 2004/0064584 | A1* | 4/2004 | Mitchell et al. | 709/245 |
| 2004/0128554 | A1* | 7/2004 | Maher et al. | 713/201 |
| 2004/0139228 | A1* | 7/2004 | Takeda et al. | 709/245 |
| 2006/0050700 | A1* | 3/2006 | Ravikumar et al. | 370/389 |
| 2006/0072569 | A1* | 4/2006 | Eppinger et al. | 370/389 |
| 2006/0203750 | A1* | 9/2006 | Ravikumar et al. | 370/261 |
| 2006/0209794 | A1* | 9/2006 | Bae et al. | 370/352 |
| 2007/0217407 | A1* | 9/2007 | Yuan et al. | 370/389 |

OTHER PUBLICATIONS

J. Rosenberg, et al., "Simple Traversal of User Datagram Protocol (UDP) Through Network Address Translators (NATs)", RFC 3489, Mar. 2003, 35 pages.
Joseph Davies, et al., "Teredo Overview", accessible at: http://www.microsoft.com/technet/prodtechnol/winxppro/maintain/teredo.mspx#XSLTsection133121120120, last updated Jul. 30, 2004, last accessed, May 20, 2005, 25 pages.
J. Rosenberg, et al., "SIP: Session Initiation Protocol", RFC 3261, Jun. 2002, 207 pages.
J. Rosenberg, et al., "Traversal Using Relay NAT (TURN)", Nov. 2001, work in progress, accessible at: http://www.jdrosen.net/papers/draft-rosenberg-midcom-turn-03.html; last accessed May 20, 2005, 25 pages.
P. Srisuresh, et.al., "IP Network Address Translator (NAT) Terminology and Considerations," RFC 2663, Aug. 1999, 23 pages.
M. Handley, et al., "SDP: Session Description Protocol," RFC 2327, Apr. 1998, 30 pages.

* cited by examiner

*Primary Examiner* — Pankaj Kumar
*Assistant Examiner* — Hicham B Foud

(57) ABSTRACT

The subject invention relates to systems and methods that facilitate direct network communications between peers that operate behind Network Address Translators. In one aspect, a network communications system is provided. The system includes one or more Network Address Translators (NAT) to communicate data across a network between peers. A protocol selection component that automatically selects among a plurality of protocols according to one or more NAT types in order to determine a subset of the protocols that facilitate communications between the peers.

2 Claims, 17 Drawing Sheets

| | D-IP | UPnP | Full Cone | Res Cone | ISA Sym | Seq Sym | Sym | Firewall |
|---|---|---|---|---|---|---|---|---|
| D-IP | 1 | 1 | 1 | 3 | 3 | 3 | 3 | 4 |
| UPnP | 1 | 1 | 1 | 3 | 3 | 3 | 3 | 4 |
| Full Cone | 1 | 1 | 1 | 3 | 3 | 3 | 3 | R |
| Res Cone | 3 | 3 | 3 | 2 | 5a | 5b | R | R |
| ISA Sym | 3 | 3 | 3 | 5a | 6a | 6b | R | R |
| Seq Sym | 3 | 3 | 3 | 5b | 6b | 6c | R | R |
| Sym | 3 | 3 | 3 | R | R | R | R | R |
| Firewall | 4 | 4 | R | R | R | R | R | R |

FIG. 3

AUTOMATED NAT TRAVERSAL FOR PEER-TO-PEER NETWORKS

TECHNICAL FIELD

The subject invention relates generally to computer systems, and more particularly, relates to systems and methods that facilitate communications between network peers according to automated protocol determinations.

BACKGROUND OF THE INVENTION

A network address translator (NAT) is an IPv4 router that can translate Internet Protocol (IP) addresses and TCP/UDP port numbers of data packets as the packets are forwarded. For example, a small business network with multiple computers that connect to the Internet may employ an NAT for such connections. This type business would normally have to obtain a public IP address for each computer on the network from an Internet service provider (ISP). With the NAT, however, the small business can use private addressing and have the NAT map its private addresses to single or to multiple public IP addresses. The NAT is a common solution for the following combination of requirements: leveraging the use of a single connection, rather than connecting multiple computers, to the Internet; using private addressing; and providing access to Internet resources without having to deploy a proxy server. Also, these translators provide a type of firewall protection by hiding internal IP addresses and they enable companies to employ more internal IP addresses since there is no possibility of conflict with addresses outside the companies' private domain.

When a private user on a small business intranet connects to an Internet resource, the user's TCP/IP protocol creates an IP packet with the following values set in the IP and TCP or UDP headers (bold text indicates the fields that are affected by the NAT):
  Destination IP Address: Internet resource IP address
  Source IP Address: Private IP address
  Destination Port: Internet resource TCP or UDP port
  Source Port: Source application TCP or UDP port The source host or another router forwards this IP packet to the NAT, which translates the addresses of the outgoing packet as follows:
  Destination IP Address: Internet resource IP address
  Source IP Address: ISP-allocated public address
  Destination Port: Internet resource TCP or UDP port
  Source Port: Remapped source application TCP or UDP port The NAT sends the remapped IP packet over the Internet, wherein a responding computer sends back a response to the NAT.

Currently, the NAT is a major obstacle to end-user applications that desire to communicate with other applications across public networks such as the Internet. Also, due to the complexity of setting up the NAT, most users do not have the sophistication or desire to configure these components properly. Thus, several types of NAT traversal mechanisms have been employed to ease such burdens on the user. The most robust NAT traversal mechanism is the Traversal Using Relay (TURN). With respect to TURN, instead of establishing a direct connection between clients A and B which are behind the NAT, both clients A and B connect to a well-known server S, which relay messages between them. Relay has the advantage that it works as long as the server S is assessable for both clients. However this places an undue processing and network burden on relay servers that act as intermediaries between peers. The delay between the clients also may increase as well. Another set of techniques include Simple Traversal of UDP through NAT (STUN) and Teredo which is designed to traverse IPv6 protocol across NAT. Through STUN/Teredo, two clients behind Cone-NAT may establish direct connection by using a well-known server S to relay initial connection messages, and to identify the public remapped source application TCP or UDP port for the NAT of each client. These protocols and others do not traverse symmetric-NAT type systems, however.

One major obstacle in NAT technology is that there is a plurality of differing protocols that may be employed for translating network traffic. For instance, many consumer or home systems utilize Cone, Full Cone, or Restricted Cone NAT technologies whereby some routers may behave as a Cone NAT for UDP traffic and behave as a symmetric NAT for TCP traffic. In corporate situations, symmetric NAT along with hardware or software firewalls are more likely to be employed. Currently, in order to communicate over the differing types of protocols, intense manual configurations are required to properly configure the NAT to communicate over one of the above mentioned protocols. However, many network situations may require more than one protocol to be employed in order for communications to occur between remote applications.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to systems and methods for automatically determining and configuring a plurality of Network Address Translator (NAT) protocols in order to facilitate communications between network peers and associated applications that operate behind such translators. In contrast to conventional systems that are manually configured in accordance with a single protocol such as Cone-Nat technologies or via employment of a relay server to assist in the translation, the subject invention utilizes an automated classification and discovery processes of various NAT protocols to determine which protocol or subset of protocols operate to traverse the NAT in order to establish a direct connection between peers. The subject invention may also traverse a majority of symmetric NAT, provided the symmetric NAT has a deterministic method in remapped source application TCP or UDP port. In this manner, burdens on devices such as relay servers can be reduced since direct connection between peers allows ongoing communications between the peers to commence without continually being routed through relay servers which can serve as bottlenecks to efficient communications. Also, by providing automatic configurations between networked systems, the subject invention mitigates administrative burdens to manually configure such systems.

In one aspect, various network protocols are classified as possible candidates for network communications. For example, such protocols can include directed IP protocols, UPnP NAT protocols, Full Cone NAT protocols, Restricted Cone Nat Protocols, and other protocols such as Symmetrical NAT protocols. Upon system initialization, an application initiates application data traffic to a network system that can include one or more NATs and a relay server. When the application data traffic has commenced, the query component automatically observes reference traffic such as responses from the NAT and/or relay server to determine a suitable NAT protocol or a subset of previously classified protocols that can be employed to establish direct communications between peers while mitigating requirements of the relay server to continue in the peer communications. Various communications processes or strategies are provided to facilitate the direct communications between peers according to differing protocols while mitigating the burden on the relay server to continually participate in the communications.

To the accomplishment of the foregoing and related ends, certain illustrative aspects of the invention are described herein in connection with the following description and the annexed drawings. These aspects are indicative of various ways in which the invention may be practiced, all of which are intended to be covered by the subject invention. Other advantages and novel features of the invention may become apparent from the following detailed description of the invention when considered in conjunction with the drawings.

BRIEF DESCRIPTION OF THE DRAWINGS

FIG. 3 illustrates an exemplary protocol matrix in accordance with an aspect of the subject invention.

DETAILED DESCRIPTION OF THE INVENTION

The subject invention relates to systems and methods that facilitate direct network communications between peers. This is achieved by classifying a plurality of network protocols and subsequently testing network responses in order to automatically determine which of the protocols may be suitable to establish the communications. Upon determination of the protocols, direct network connections can be established between peers while mitigating the need for devices such as relay servers to continue in the communications. In one aspect, a network communications system is provided. The system includes one or more Network Address Translators (NAT) to communicate data across a network between peers. A query component automatically tests a plurality of protocols in accordance with the NAT in order to determine a subset of the protocols that facilitate communications between the peers.

As used in this application, the terms "component," "translator," "system," "object," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
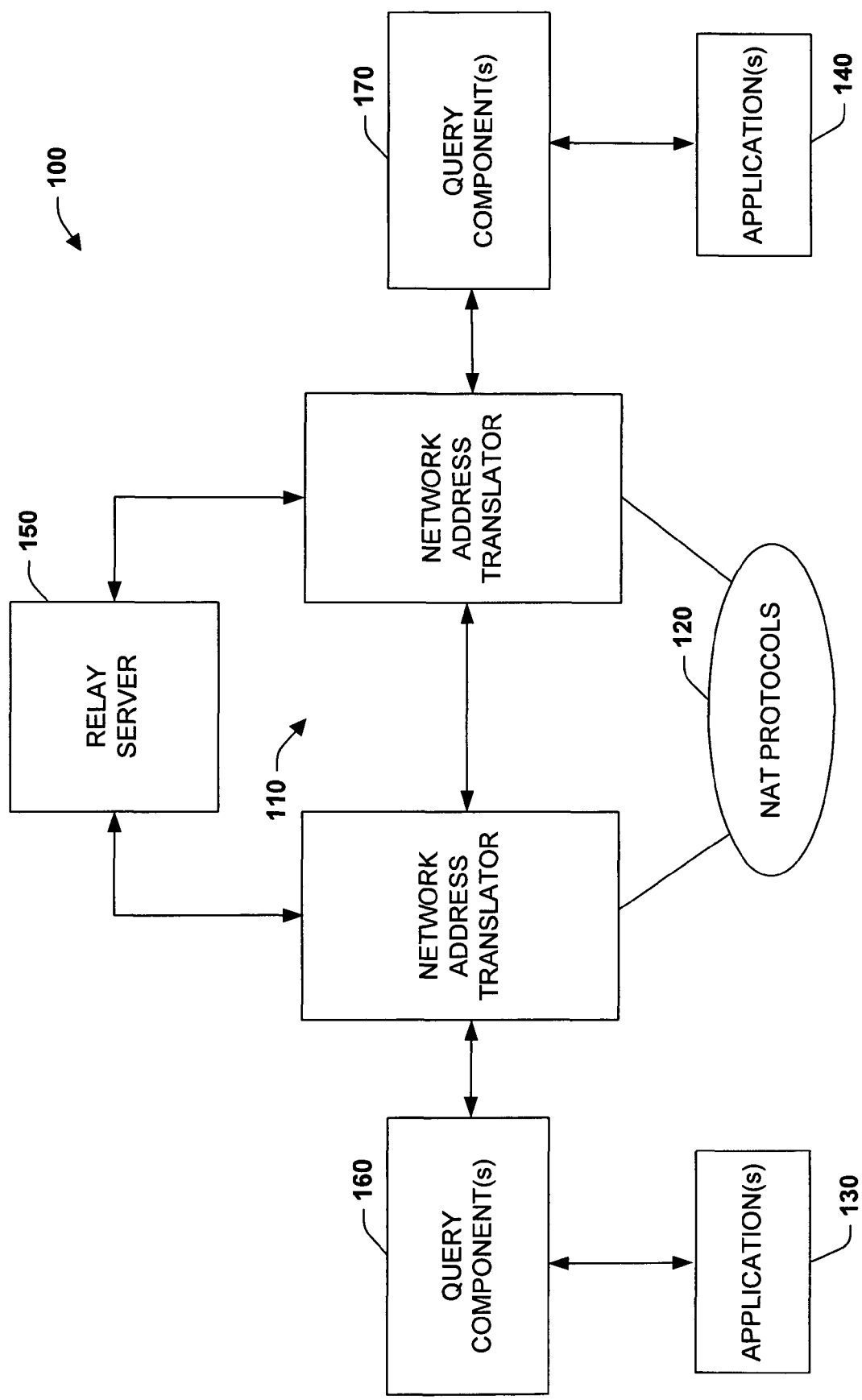
FIG. 1 is a schematic block diagram illustrating an automated protocol routing system in accordance with an aspect of the subject invention.

Referring initially to FIG. 1, an automated protocol routing system 100 is illustrated in accordance with an aspect of the subject invention. The system 100 includes one or more network address translators 110 (NAT) that operate according to a plurality of NAT protocols 120. Such protocols 120 enable communications between one or more end-user applications shown at 130 and 140, respectively. Also, a relay server 150 may be employed to facilitate communications between NATs 110 in the event precise protocol compatibility is not possible. In the Internet today, for example, many end-user computers operate behind the NAT 110 or functional equivalent thereof. According to the subject invention, NAT traversal enables end-user computers or applications to establish direct connection between such entities, without a server to relay the message. This can greatly reduce the server load and maintenance cost of a Messenger service (e.g., MSN messenger, ICQ, Yahoo! Messenger), enable real-time audio/video communication between the end-user nodes or applications, and enable peer-to-peer applications such as peer-to-peer media delivery, distributed web hosting, and so forth.

The NAT protocols 120 perform the traverse function according to the types of the two NATs 110 connected to the application 130 and the application 140. The types of the NATs can be specified by the end user. Optionally, one or more query components 160, 170 can be provided to classify and discovery the NAT types. In general, the NAT traversal protocol can traverse more NATs than conventional NAT traversal technology such as STUN and Teredo, for example. With the NAT traversal protocol of the subject invention, more computers behind the NAT 110 can establish direct connections between peers while limiting interactions or network load on the relay server 150. For example, the NAT traversal protocol can traverse 1) between symmetric NAT and direct-IP, UPNP and Full Cone NAT, 2) through ISA (Internet Security & Acceleration Server) NAT and symmetric NAT with deterministic port assignment.

To illustrate an example of the system 100 communications, let A and B include two clients that desire to establish a connection between themselves where the connection is established in the following manner. First, client A and client B determines its respective NAT property. Then, each client forms a connection vector, which includes the private IP address/port of the client, the WAN IP address/port of the client (if the client is not connected to a symmetric NAT), the relay server address/port employed by the client, as well as the NAT property. After this determination, one of the clients (say client A) retrieves or receives the connection vector of the other client (client B) via an outside mechanism, e.g., email, publish in a common forum/web server, register on a public server for the other clients to retrieve, and so forth. To initiate the connection, the client A sends its own connection vector through the relay server of B, and attempts to connect to the client B via its private and WAN IP address/port. One goal among others is for the client A and the client B to establish a direct connection as much as possible. If the connection attempts fail, then the client A and the client B may use the relay server to relay messages.

Upon system initialization, the application 130 initiates application data traffic that is directed through the query component 160. When the application data traffic has commenced, the query component 160 automatically observes reference traffic such as responses from the NAT 110 and/or relay server 150 to determine a suitable NAT protocol 120 or a subset of previously classified protocols 120 that can be employed to establish direct communications between peers while mitigating requirements of the relay server 150 to continue in the peer communications. Various traversal processes or strategies are provided to facilitate the direct communications between peers according to differing NAT protocols 120 while reducing the burden on the relay server 150 to continually participate in the communications. These processes include various types of queries or probes that can be directed by the query component 160 to determine which subset of NAT protocols 120 may be employed for a given application. Also, the traversal processes can operate in conjunction with the relay server 150 during initialization and discovery, and subsequently bypass the relay server 150 if a suitable NAT protocol 120 is determined. The traversal processes are described in more detail below with respect to FIGS. 5 through 15.

Figure 2:
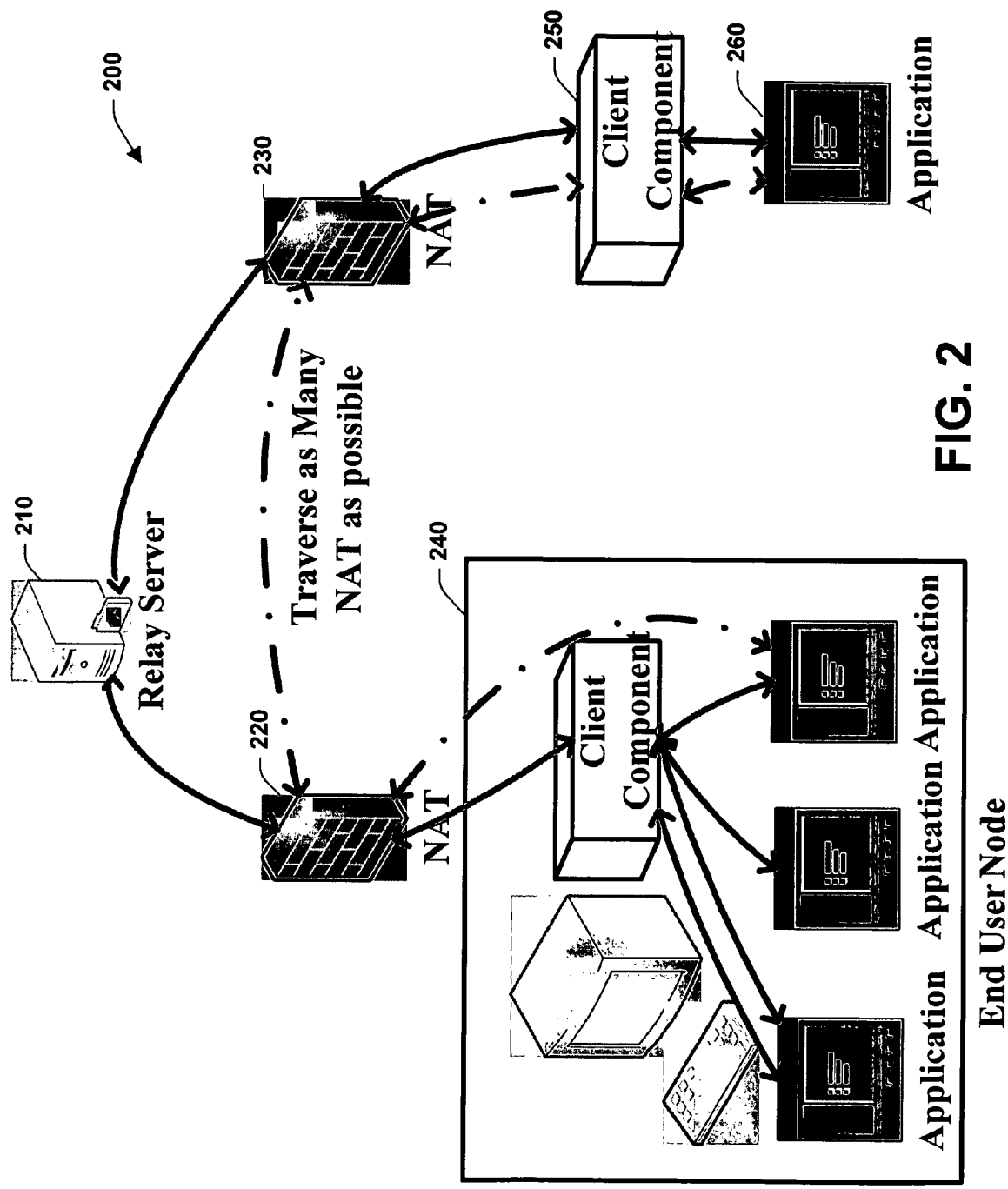
FIG. 2 is a block diagram illustrating an exemplary NAT traversal system in accordance with an aspect of the subject invention.

Referring now to FIG. 2, an exemplary NAT traversal system 200 is illustrated in accordance with an aspect of the subject invention. The system 200 includes a relay server 210 that communicates with one or more NATs 220 and 230. At 240, a typical end user configuration may include a computer, client component, and one or more applications. At another end of communications, a client component 250 and a single application 260 communicate with the components depicted at 240. In general, the client components at 240 and 250 operate with the relay server 210 to determine a suitable NAT traversal protocol to facilitate direct communications between applications at 240 and 260 (e.g., query/test the relay server and/or NAT to automatically discover a suitable protocol for traversal).

In one aspect, the relay server 210 provides a reflection functionality which is to discover Wide Area Network (WAN) addresses and NAT status, for example. Another function of the relay server 210 includes relaying messages between the networks peers. The client components at 240 and 250 communicate with the relay server (and/or NAT) to automatically determine and implement suitable NAT protocols. Typically, one client component is installed on a machine that operates one or more communicating applications and function as a Component Model Object (COM) and as a local server for the applications.

With respect to reflection noted above, an application sends a packet or packets to initiate a TCP or UDP connection with the relay server 210, whereby the relay server returns its WAN side address, which is the remapped source application TCP or UDP port. A client machine is identified via a connection vector, which includes the Private_IP:port of the client machine, the WAN_IP:port of the client (if the client is not connected to a symmetric NAT), the WAN_IP:port of the relay server, as well as the NAT property. One difference between the protocols of the subject invention with prior solutions is that the client machine is identified in multiple aspects, via its private Internet address/port, its WAN address/port and the address/port of the relay server, for example. In the following description, it can be shown that this technique facilitates the other clients to establish a direct connection with the current client as much as possible.

The connection vector of the client may include other optional information to further establish the identity of the client, e.g., a Name (full domain name service (DNS) resolve), a last active time property (to gauge how probable that the client is still available), and a ping vector. When two clients A and B desire to communicate, at least one client should have the connection vector of the other client. The connection vector may be delivered to the other clients via a number of techniques, e.g., email, publish in a common forum/web server, register on a public server for the other clients to retrieve, and so forth.

Depending on the NAT types, different strategies can be employed to traverse the NAT. FIG. 3 illustrates an example protocol matrix 300 in accordance with an aspect of the subject invention. In the matrix 300, example NAT traversal strategies are illustrated. For instance, on a horizontal axis 310 are listed eight potential network protocols that correlate via the matrix 300 to a vertical axis 320 of eight potential protocols. Arbitrary numbers are listed in the matrix 300 that associate a NAT traversal strategy or process between network protocols and are described in more detail below with respect to FIGS. 5-15, whereby the number 1 correlates to FIG. 5, the number 2 correlates to FIG. 6, and so forth with the designator 6c correlating to FIG. 15. The designator "R" on the matrix 300 indicates that a relay server remains involved during ongoing communications between peers.

The NAT types listed on the matrix 300 include: A. Directed IP connection, B. UPNP NAT, C. Full Cone NAT, D. Restricted Cone NAT or Port Restricted Cone NAT, E. Symmetrical NAT with ISA server, F. Symmetrical NAT with deterministic Port Assignment, G. Symmetrical NAT that does not have properties of protocols E or F, and H. Firewall with restricted out-going port constraints.

For direct IP connection (D-IP, type A NAT), the client generally resides on the Internet without other NAT devices. It may be directly accessed by the other clients as well. In all other cases, the client is behind the NAT with certain properties. With the UPnP NAT (type B NAT), applications may assign dynamic port mappings to the NAT and delete the mappings when the connections are complete. Since the UPnP NAT allows the application to directly manipulate the NAT, and map certain WAN IP address/port directly to the private IP address/port of the client, for NAT traversal purposes, the UPnP NAT behaves as if the client is directly connected to the Internet.

Generally, all Cone NAT, including the Full Cone NAT, the restricted Cone NAT and the port restricted Cone NAT, reuses the port mapping so that the external NAT mapping becomes end point independent. That is, traffic initiated from the same internal IP address and port (private_IP:port) can be mapped to the same external IP address and port (WAN_IP:port). The differences are in the external filtering behavior of the NAT of whether forwarding outside traffic directed (WAN_IP:port) to the internal address (private_IP:port). For Full Cone NAT (type C NAT), the external filtering of the NAT is endpoint independent. The NAT forwards packets destined to (WAN_IP:port) towards the internal client at (private_IP:port). For Restricted Cone NAT (type D NAT), the external filtering of the NAT is endpoint address dependant. The NAT will filter out packets from a certain external client (IP_Y:port_Y) attempting to connect to (WAN_IP:port), if the internal client at (private_IP:port) has not sent packets to IP_Y before.

For Port Restricted Cone NAT (type E NAT), the external filtering of the NAT is endpoint address and port dependant. The NAT will drop packets from a certain external client (IP_Y:port_Y) attempting to connect to (WAN_IP:port), if the internal client at (private_IP:port) has not sent packets to (IP_Y:port_Y) before. A symmetric NAT is one where requests from the same internal IP address and port (private_IP:port) to a specific destination IP address and port (destine_IP:port) are mapped to the same external IP address and port (WAN_IP:port). However, if the same host sends packets from the same private address (private_IP:port), but to a different external IP address or port, a different mapping can be used. Moreover, typically only the external host that receives the packets can send the packets back to the internal host.

Many corporate grade NAT are symmetric NAT, whereas many consumer grade NAT behave in Cone NAT mode for UDP traffic, but may behave in symmetric NAT mode for TCP traffic. Marketing research shows that 20% of the NAT demonstrates symmetric NAT behavior for UDP traffic. However, 40% of the NAT demonstrates symmetric NAT behavior for TCP traffic. Among the symmetric NAT, there are symmetric NAT with certain interesting behaviors. For example, with the ISA symmetric NAT (type F NAT), the WAN side port may be discovered through a standard getsockname ( ) call. Thus, the (WAN_IP:port) assigned for a certain outgoing traffic can be discovered by the internal application. A more common type of symmetric NAT is the symmetric NAT with deterministic port assignment (type G NAT). Such symmetric NAT distributes WAN side port in a deterministic manner, often sequentially.

It is noted that ISA symmetric NAT is a symmetric NAT with deterministic sequential port assignment property. In the case of the symmetric NAT, if the application uses the same internal (private_IP:port) for outgoing connections, certain symmetric NAT may not distribute the WAN side port in a deterministic manner. Nevertheless, if the application selects a new random internal (private_IP:port) for each new outgoing connection, the symmetric NAT is more inclined to assign the outside port (WAN_IP:port) in a deterministic, usually sequential manner. The majority of NAT/firewalls on the market today satisfy the deterministic sequential port assignment property. Since the symmetric NAT generally use a different mapping for a different external IP address or port, it is recommended that when the application detects that it is behind the symmetric NAT, it uses a random (private_IP:port) for each new outgoing connection.

The final category of NAT is the Firewall with egress traffic filtering. With such NAT, only traffic from specific (private_IP:port) to certain known external service ports (e.g., 80, 23, 53, and so forth) are allowed. Generally, to communicate with clients behind the Firewall, a client must be connected directly to the Internet or is connected to a UPnP NAT, and is able to use the external service ports allowed by the Firewall NAT. Otherwise, a relay server that uses the external service ports allowed by the Firewall NAT is incorporated to relay the ongoing traffic.

Figure 4:
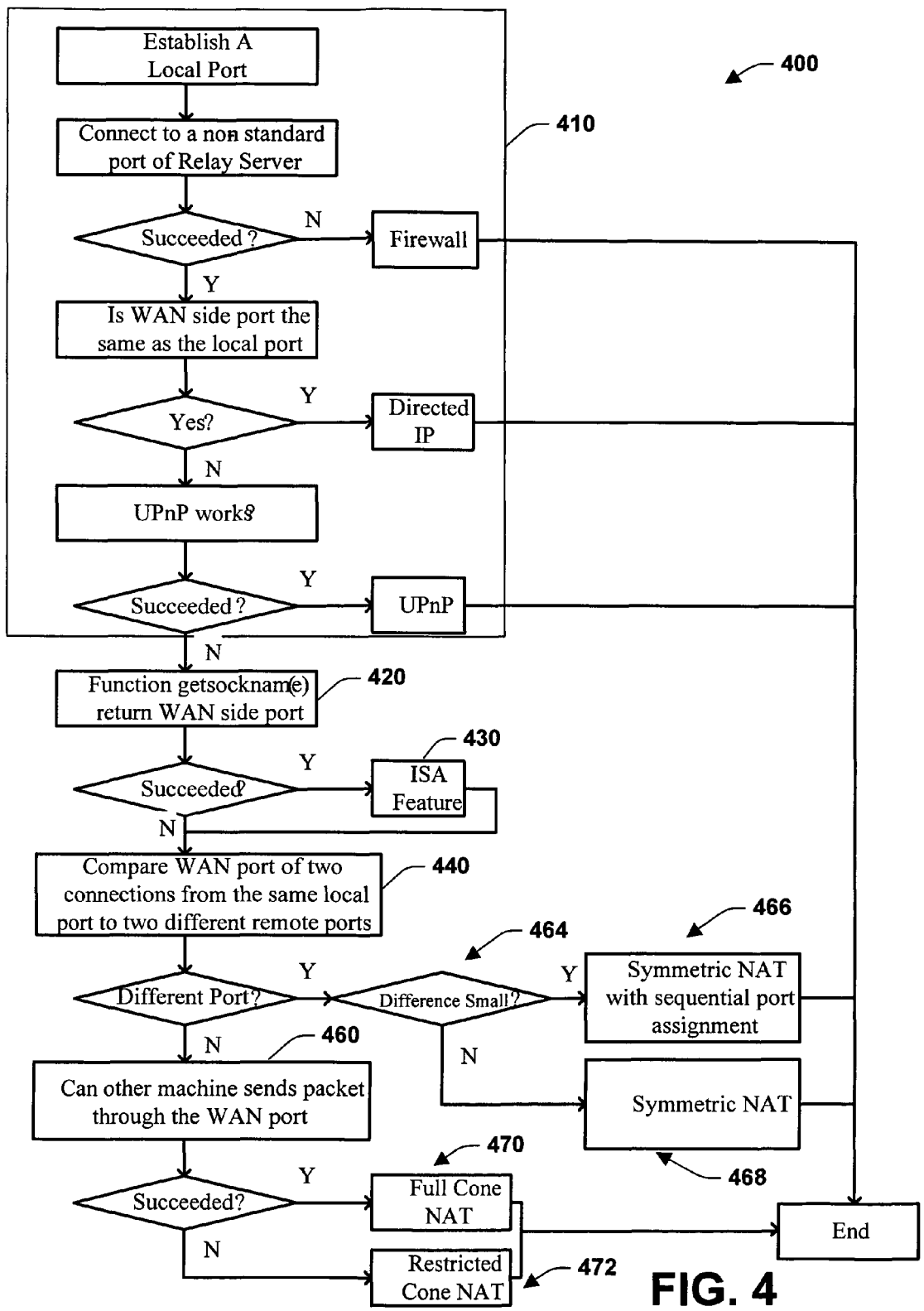
FIG. 4 is a flow diagram that illustrates an automated discovery process in accordance with an aspect of the subject invention.

One aspect in an NAT traversal protocol of the subject invention involves the determination of the relevant NAT type. FIG. 4 illustrates an automated protocol discovery methodology 400 in accordance with an aspect of the subject invention. While, for purposes of simplicity of explanation, the methodology is shown and described as a series or number of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

In this aspect, an NAT discovery process 400 is illustrated. One goal of the NAT discovery process is to determine the NAT property in order to determine an efficient process to traverse the NAT. This process 400 is typically performed by the client component described above during initialization. Proceeding to 410, initial processing includes establishing a local port and attempting to connect to a non-standard port of a Relay Server. If this connection fails, the NAT is behind a Firewall with egress traffic filtering. The clients may go on to determine the ports allowed by the Firewall, and the determination of NAT type ends here. If the connection succeeds, the next decision is whether a WAN side (WAN_IP:port) is the same as the local address and port observed by the application. If this is the case, the client is directly connected to the Internet, and the process ends. The final decision at 410 is whether the NAT responds to UPnP control commands. If so, a UPnP NAT connection is established and the process ends.

Proceeding to 420, a function getsockname( ) is called to determine if WAN port address is returned. If so, a flag is set at 430 indicating an ISA (Internet Security & Acceleration Server) feature has been detected. At 440, the client connects to two different outside ports of the relay server from the same (private_IP:port). If the WAN ports returned by the relay server are the same, the NAT is a Cone NAT and the process proceeds to 460. Otherwise, the NAT is a symmetric NAT and the process proceeds to 464. For symmetric NAT, a series of connection requests is issued by the client to the relay server, with the assigned WAN ports examined. If the assigned WAN ports are shown to be in a deterministic manner (in the case of sequential port assignment, the assigned WAN port will be sequentially increasing/decreasing, with small gaps at 464 caused by the interfering traffic using the same NAT. The symmetric NAT with generic deterministic port assignment property refers to an NAT having a function f(i) to assign port numbers for a connection relating to an ith session, where the function f(i) can be determined by the client by observing the assigned port number), a Symmetric NAT with deterministic port assignment is established at 466. If no pattern on the assigned WAN ports can be identified, a generic symmetric NAT is established at 468 and the process ends.

If the comparison at 440 determines that the NAT is a Cone NAT, the process proceeds to 460. The client requests the relay server to use another port to send a packet to the (WAN_IP:port), and to use a second relay server to send another packet from an alternative internet address to the (WAN_IP:port). If the packet from an alternative internet address goes through, a Full Cone NAT connection is established at 470 and the process ends. If only the packet from an alternative port goes through, a Restricted Cone NAT is established at 472 and the process ends.

For clients that are not directly connected to the Internet, they are identified via a connection vector, which includes the Private_IP:port of the client machine, the WAN_IP:port of the client, the WAN_IP:port of the relay server, as well as the NAT property. Each client behind the NAT is also attached to a relay server, which may relay initial connection messages before connection between the clients are established. For clients A and B that desire to connect to each other, at least one of the client (say client A) should obtain the connection vector of the other client (client B) via certain external means, e.g., email, publish in a common forum/web server, register on a public server for the other clients to retrieve, and so forth. The Client A may then attempt to connect to the client B via protocols outlined in FIG. 3. Since the client A and B may be behind the same NAT, or they may be in the same organization, and thus may be reachable through (private_IP:port) even though they belong to different NAT, the client A should always attempt to connect to the (private_IP:port) supplied in the connection vector of B. This will facilitate that a direct connection can be established between the clients A and B if their (private_IP:port) is reachable. This connection attempts involves the client A to send an initialization packet via either TCP/UDP protocol (determined by whether UDP direct connection or TCP direct connection is desired) to B's private_IP:port. If B receives this packet towards its private_IP:port, the clients A and B are reachable via their private addresses, and they may establish a direct connection.

FIGS. 5-15 illustrate example NAT traversal processes in accordance with an aspect of the subject invention. As discussed above, the client always try the other's private_IP:port. For the purposes of brevity, in the following sections, it can be assumed that the clients are not reachable via their private addresses. As noted above, these processes are correlated with the traversal matrix depicted in FIG. 3, and determined by the NAT type of the involving clients, whereby the number 1 in FIG. 3 correlates to FIG. 5, the number two in FIG. 3 correlates to FIG. 6, the number 3 in FIG. 3 correlates to FIG. 7 and so forth.

Figure 5:
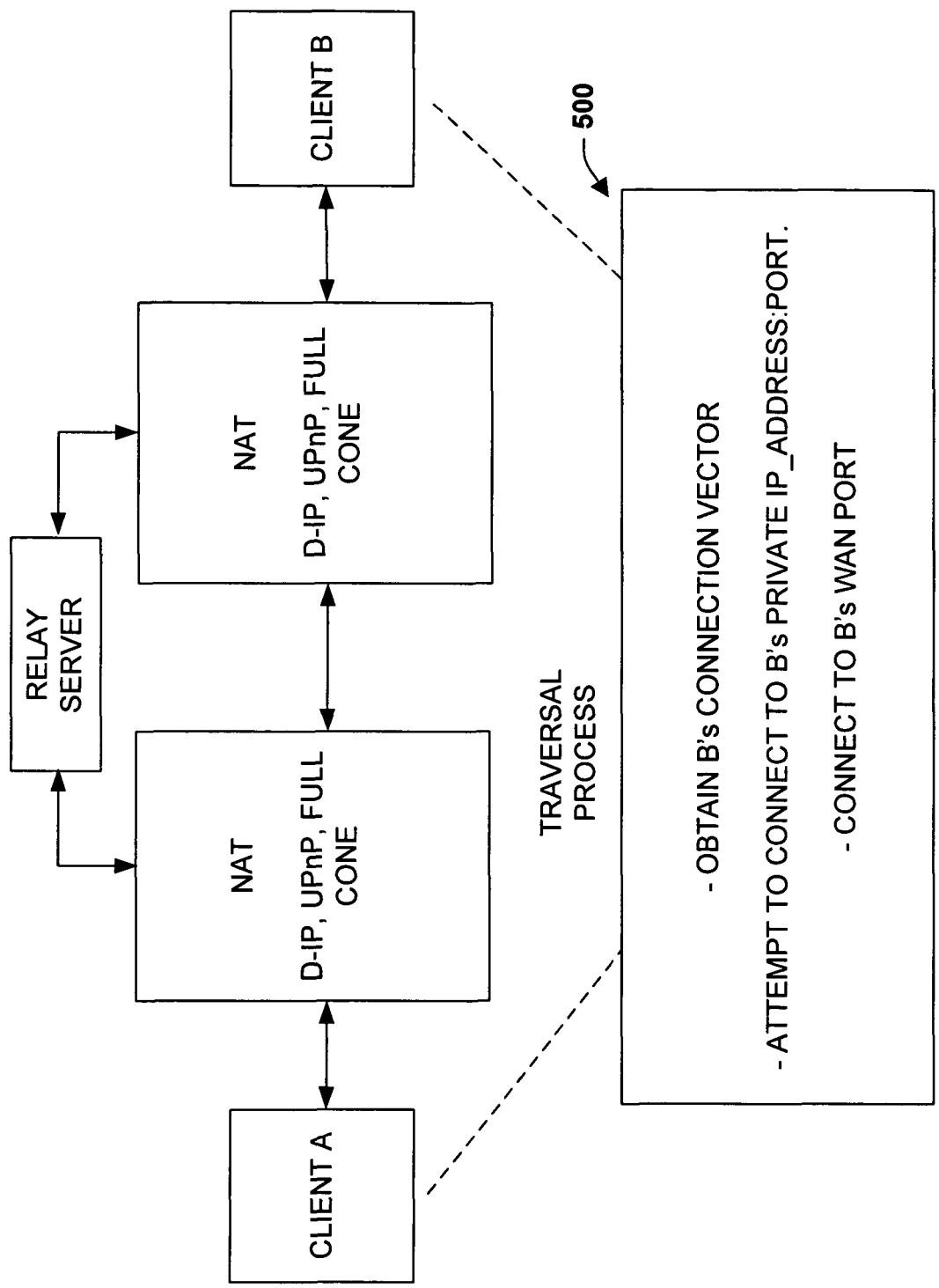
FIGS. 5-15 illustrate example NAT traversal processes in accordance with an aspect of the subject invention.

Proceeding to FIG. 5, a first NAT traversal process 500 is illustrated. In this example, an application communicates through a client component to an NAT and a relay server if necessary, whereby a port A is associated with a client component A and a Port B is associated with a client component B. In this case, Port A: is either D-IP, UPnP, or Full Cone and Port B: is either D-IP, UPnP, of Full Cone. In this case, the traversal strategy 500 A->B communications is the same as B->A communications. Thus, at 500 the process obtains B's connection vector, and sends an initialization packet via either TCP/UDP protocol (determined by whether UDP direct connection or TCP direct connection is desired) to B's WAN_IP:port. A connection is established when B receives the packet from A, as subsequent traffic can follow this path.

Figure 6:
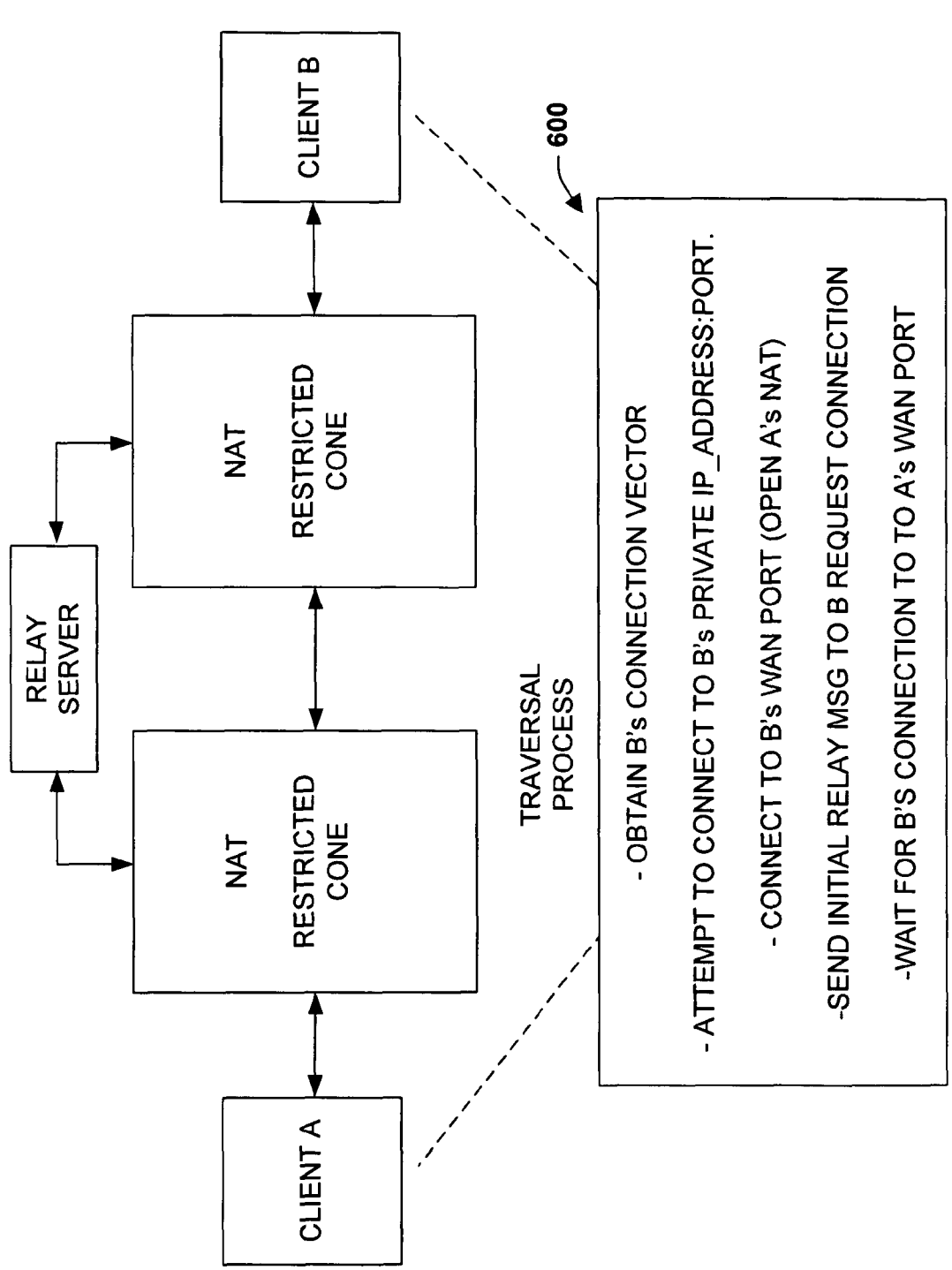

Proceeding to FIG. 6, client A and client B is behind a Restricted Cone NAT or Port-restricted Cone NAT. Similar to FIG. 5, the procedure for A->B and B->A is the same. In this example, a process 600 includes obtaining B's connection vector, sending initial packet to B's (WAN_IP:port) (open A's NAT). A then sends its connection vector to B via B's relay server. Upon receiving A's connection vector, B connects to A's (WAN_IP:port). Because A's NAT is opened by the initial packet sent to B's (WAN_IP:port), this packet reaches the client A and constitutes B's confirmation. It is noted that if a UDP connection is used, both initial packet and initial relay may need to be re-sent due to possible packet loss.

Figure 7:
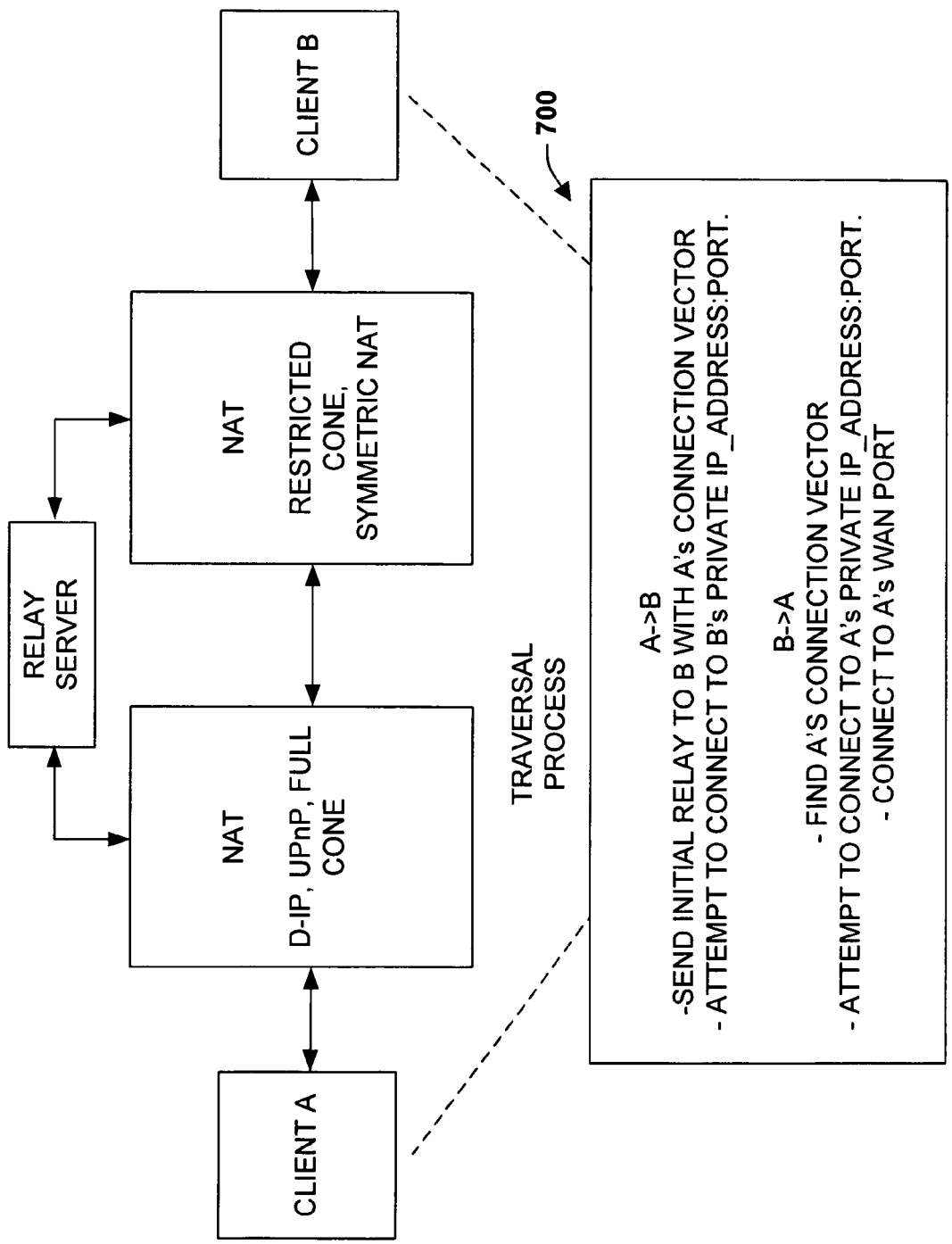

Referring to FIG. 7, a third traversal process 700 is illustrated. In this example, the client A is D-IP, or behind a NAT with UPnP or Full Cone protocol, and the client B is behind a Restricted Cone or Symmetric NAT. In this case, the communication from A->B is different than B->A. For A->B at 700, A first sends its connection vector to B through B's relay server. Then the connection resorts to B->A, where the client B sends an initialization packet via TCP/UDP protocol to the client A. Because the client B sends the initialization packet, B's NAT regards the traffic as outgoing traffic, and grants the connection. Upon receiving the connection packet from B, the client A may establish connection with B, and sends following traffic through the connection.

Figure 8:
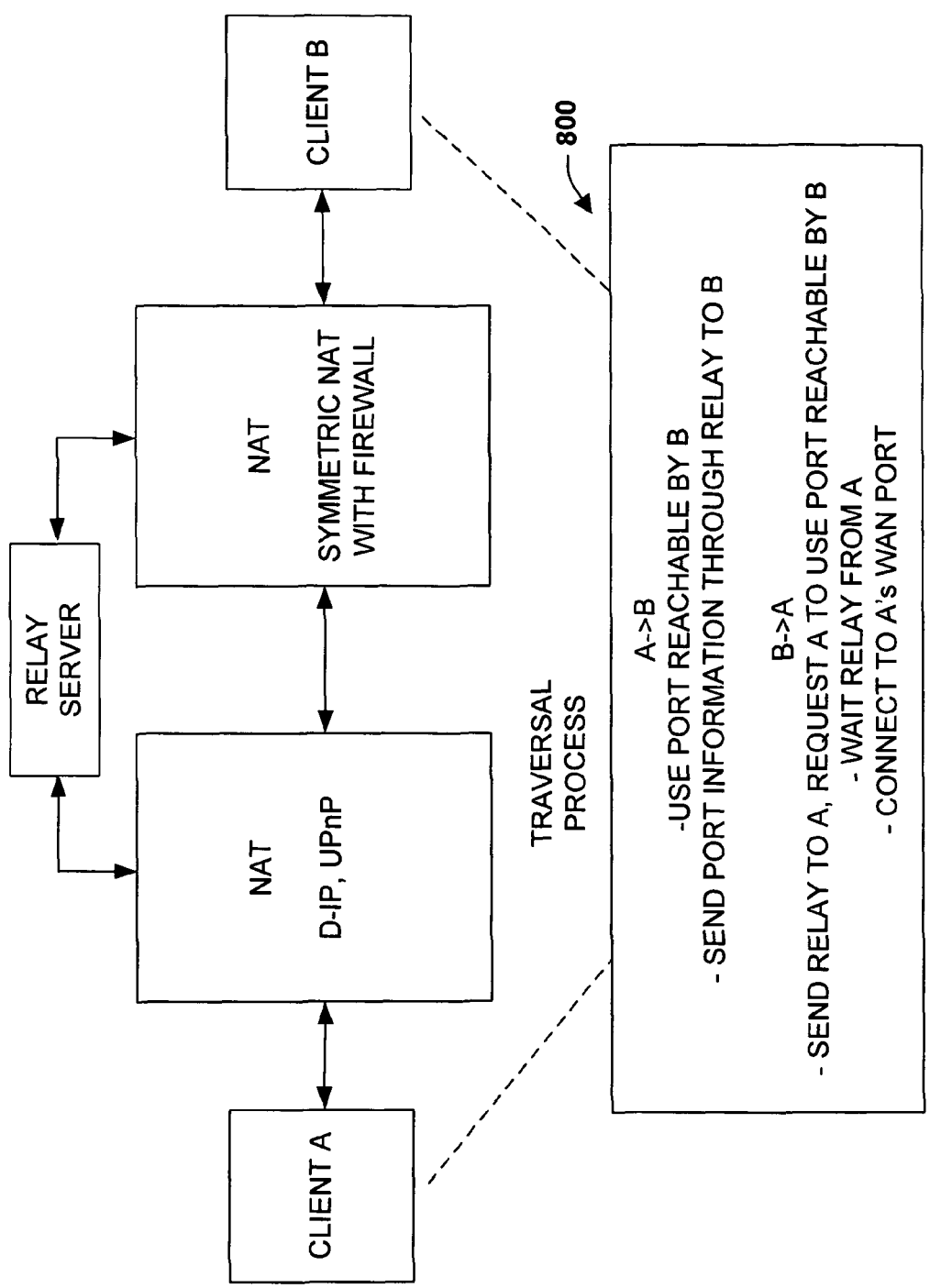

Turning to FIG. 8, a process 800 is illustrated and also includes differing communications depending on the direction from A to B or B to A. In this example, the client A is D-IP or behind a UPnP NAT and the client B is a symmetric NAT with Firewall protection (egress traffic filtering). Assuming that the client A may use ports allowed by the egress traffic filtering of B's firewall, it is possible to establish a direct connection between the clients A and B. For A->B, A selects a port allowed by the egress traffic filtering of B's firewall. It then sends its connection vector (A's port) to B, through B's relay server. Upon receiving A's connection vector, B attempts to connect to A's port, thus completes the connection.

Figure 9:
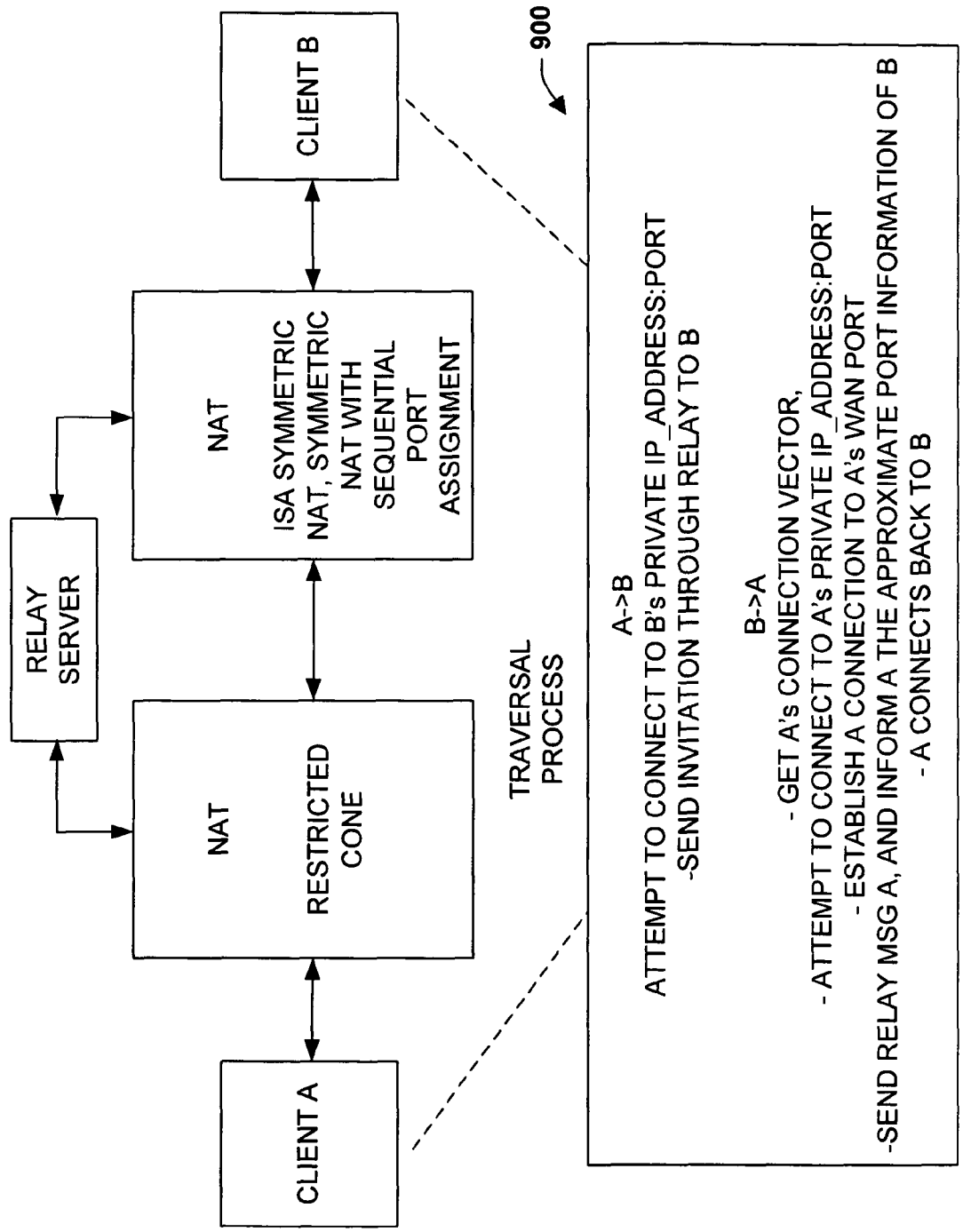

FIG. 9 illustrates a fifth traversal process 900, wherein the client A is connected to a Restricted Cone NAT and the client B is connected to an ISA symmetric NAT, or a symmetric NAT with deterministic port assignment. The difference of this traversal process versus the traversal process described in FIG. 7 lies in the fact that B's NAT will generate a new WAN port each time B attempts to connect to a different address, port. Therefore, the WAN_IP:port included in B's published connection vector may not be correct for the session. Additional effort is needed to get B's WAN_IP:port. In the following, it can be shown how the client A and client B may traverse their NAT, and establish a direct connection. In the traversal process, the client B, which is behind a more restricted NAT, sends the initial connection packet.

Figure 10:
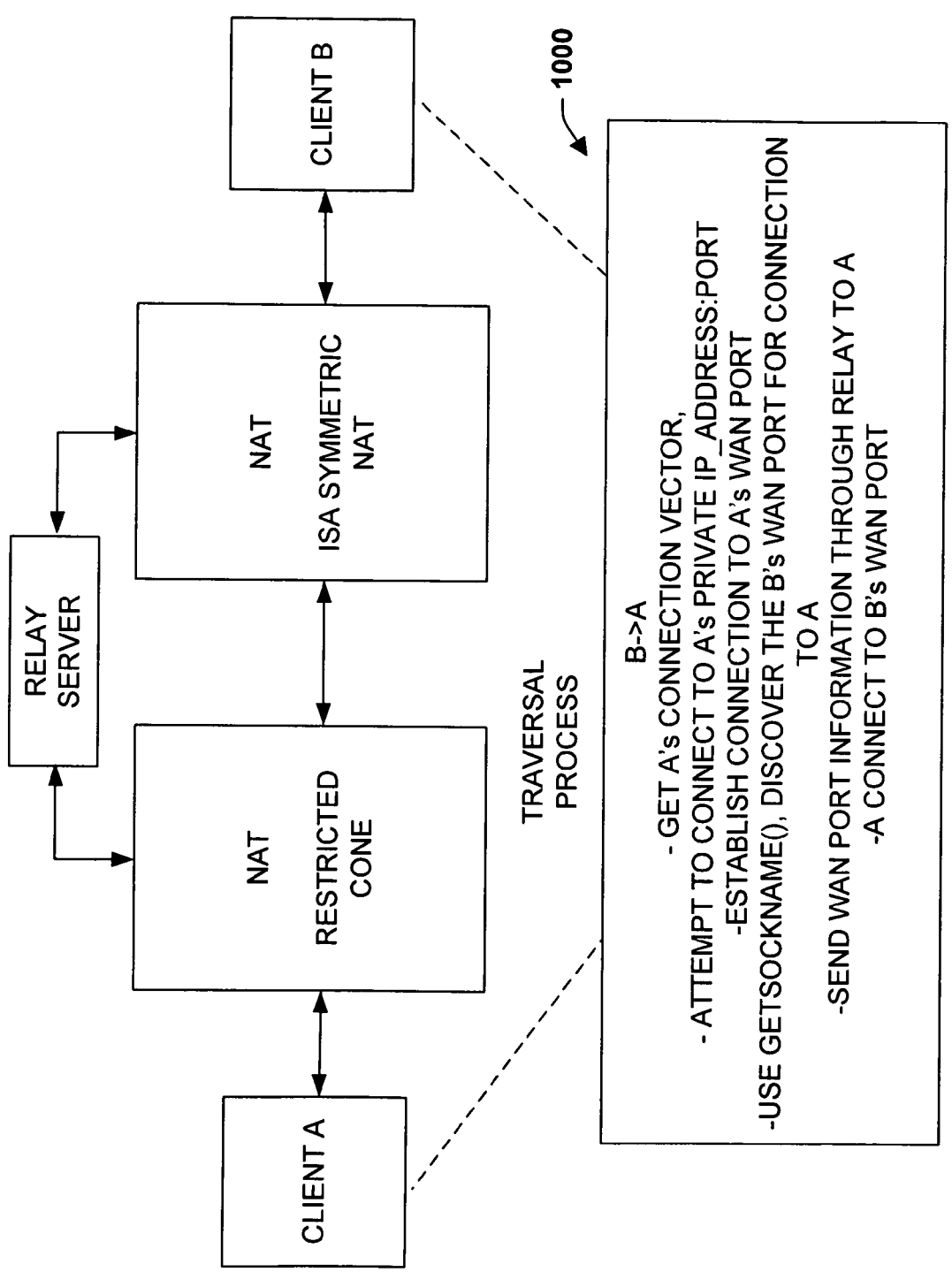

FIG. 10 illustrates a traversal process 1000 (protocol 5a in FIG. 3), wherein the client A is connected to a Restricted Cone NAT and the client B is connected to an ISA symmetric NAT. For A->B at 1000, A first sends its connection vector to B through B's relay server. Then the connection resorts to B->A, where the client B sends an initialization packet via either TCP/UDP protocol to the client A's WAN_IP:port. Because the client B sends the initialization packet, B's NAT regards the traffic as outgoing traffic, and grants the connection. In addition, using the fact that B is connected to an ISA NAT, the client B uses a getsockname( ) call to obtain the WAN_IP:port of the specific session of B's initialization connection. Client B then updates its connection vector with the updated WAN_IP:port, and sends this information to the client A through A's relay server. Upon receiving the connection vector from B, the client A sends its initialization packet towards the WAN_IP:port in the updated connection vector of B. This establishes the connection with B, as the WAN_IP:port is the specific port used for B's connection to A's WAN_IP:port.

Figure 11:
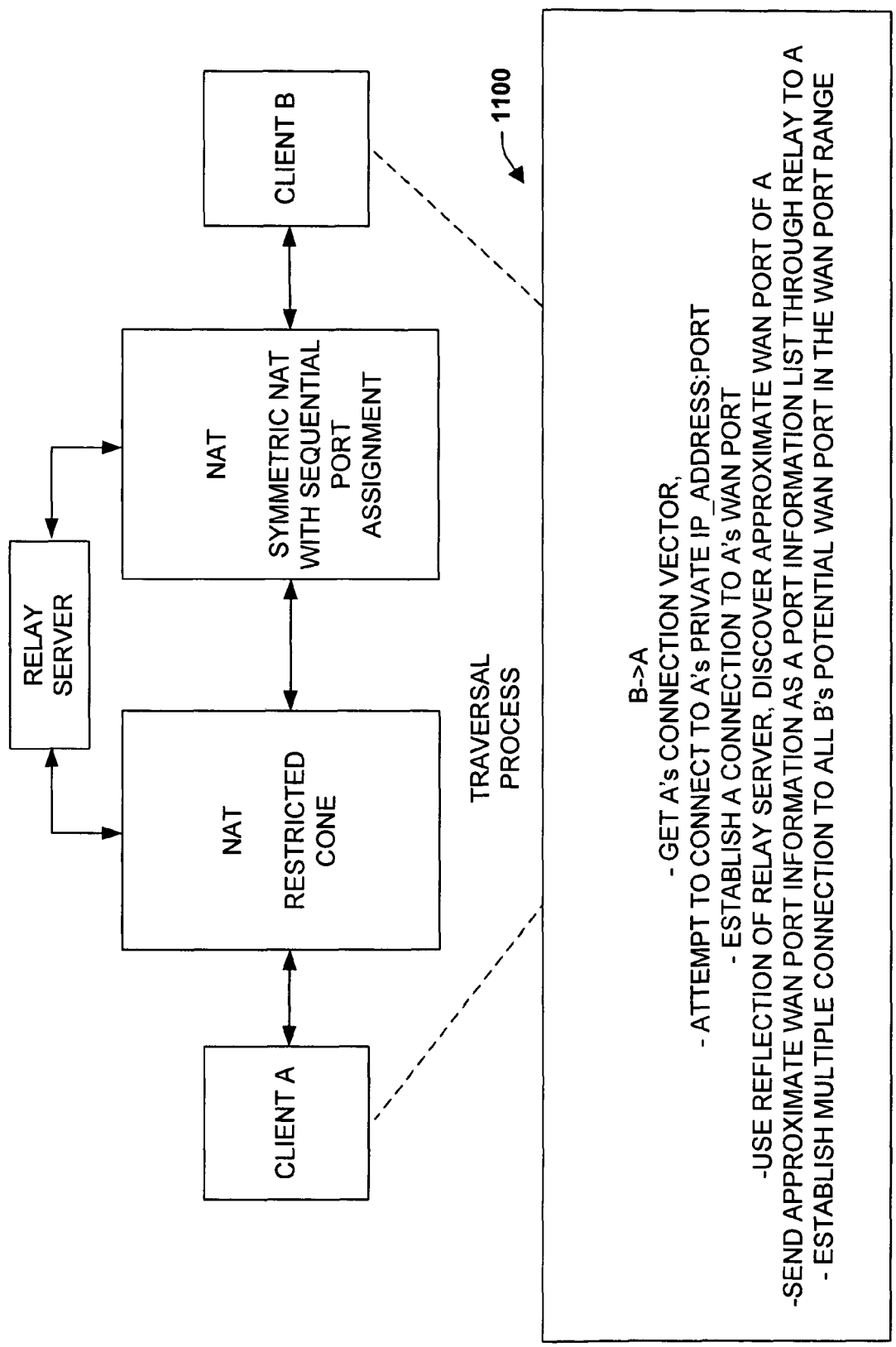

Turning to FIG. 11, a traversal process 1100 (protocol 5b in FIG. 3) applies when the client A is connected to the Restricted Cone NAT and the client B is connected to a Symmetric NAT with deterministic port assignment property. In this case, the client B cannot obtain the WAN_IP:port for its connection to the client A. Nevertheless, the client A may estimate the WAN_IP:port of the client B via auxiliary help from the relay server and using the fact that the client B is a Symmetric NAT with deterministic port assignment property. Before proceeding, it is noted that the example port discovery processes shown and described in FIGS. 11, 14, and 15 relate to specific examples of port discovery with symmetric NAT having deterministic port assignment properties. It is to be appreciated that more generalized or generic processes are also applicable and within the scope of the present invention. The generic process is as follows: Assume that there are m connection sessions to outside addresses, each session with $n\_i$, $i=1,2,\ldots,m$ connections. It can be established in rapid succession the following connections:

One connection to a relay server,
    in session 1, $n\_1$ desired connections to an outside address, then one connection to the relay server,
    in session 2, $n\_2$ desired connections to an outside address, then one connection to the relay server, in session 3, n_3 desired connections to an outside address, then one connection to the relay server, and so on. For each connection, the client generates a new random private IP_address:port to connect the outside address and/or the relay server. With each connection to the relay server, the relay server reports back to the client the observed WAN_IP: port of the connection. This enables the client to find the WAN port range for each connection session. The client may then compile a port information list, which is sent to the other client.

As an optional verification step, the client may examine the two WAN_IP:ports returned by the relay server before and after a connection session, and calculate the number of interfering traffic patterns. For instance, assume n_i connections are established to outside addresses in session i, if the observed gap in the WAN ports of the connections to the relay server just before and after the connection session is only slightly larger than n_i, there are few interfering traffic conditions. This enables the partner client to deduce the WAN ports of the desired connections to the outside address relatively easily. If the observed gap is much larger than n_i, there are many interfering traffic conditions. Such connection session with many interfering traffic conditions may be dropped from the port information list, as it may be difficult for the partner client to determine the WAN ports.

In this example, for A->B at 1100, A first sends its connection vector to B through B's relay server. Then the connection resorts to B->A. The client B can initiate about three connections in quick session via either TCP/UDP protocol (determined by whether UDP direct connection or TCP direct connection is desired). The first connection is directed towards B's relay server, the second connection is directed towards A's WAN_IP:port, and the third connection is directed towards B's relay server again. For each connection, the client B generates a new random private IP_address:port for the connection. In the first and third connection, because the client B is connected to a known reachable relay server, the relay server reports back to the client B the observed WAN_IP:port of the two connections.

As an optional verification step, the client B examines the WAN_IP:ports returned by the relay server for the two connections. If the gap between the two WAN_IP:ports is large, the client B may discard the information gathered in the previous connections and reinitiate three new connections. When the gap between the two ports is small, the client B sends the observed WAN_IP:ports of the two connections towards the client A through A's relay server. When the client A receives this information, it initializes a sequence of connections towards the ports that are within the gap between the two WAN_IP:ports reported by B's relay server. One of the connections should match the WAN_IP:ports of the connection initiated by B attempting to connect to A's WAN_IP: ports, and the connection should go through. This establishes the connection with B.

For example, assume that the port is sequentially assigned, assume the A's WAN_IP:port is port 131.107.24.9:24391, for example. It may be deduced that the WAN port to A is approximately 131.107.24.9: (24391-N . . . 24390). Also, the socket should be opened when a packet to port A is sent, to reduce size of N. The next phase of the process 1100 is to send approximate WAN port information through relay to A. Then, A sends multiple (N) initial packets to B's WAN port in the WAN port range, and waits for at least one packet to hit B's WAN port and get through to establish communications.

Figure 12:
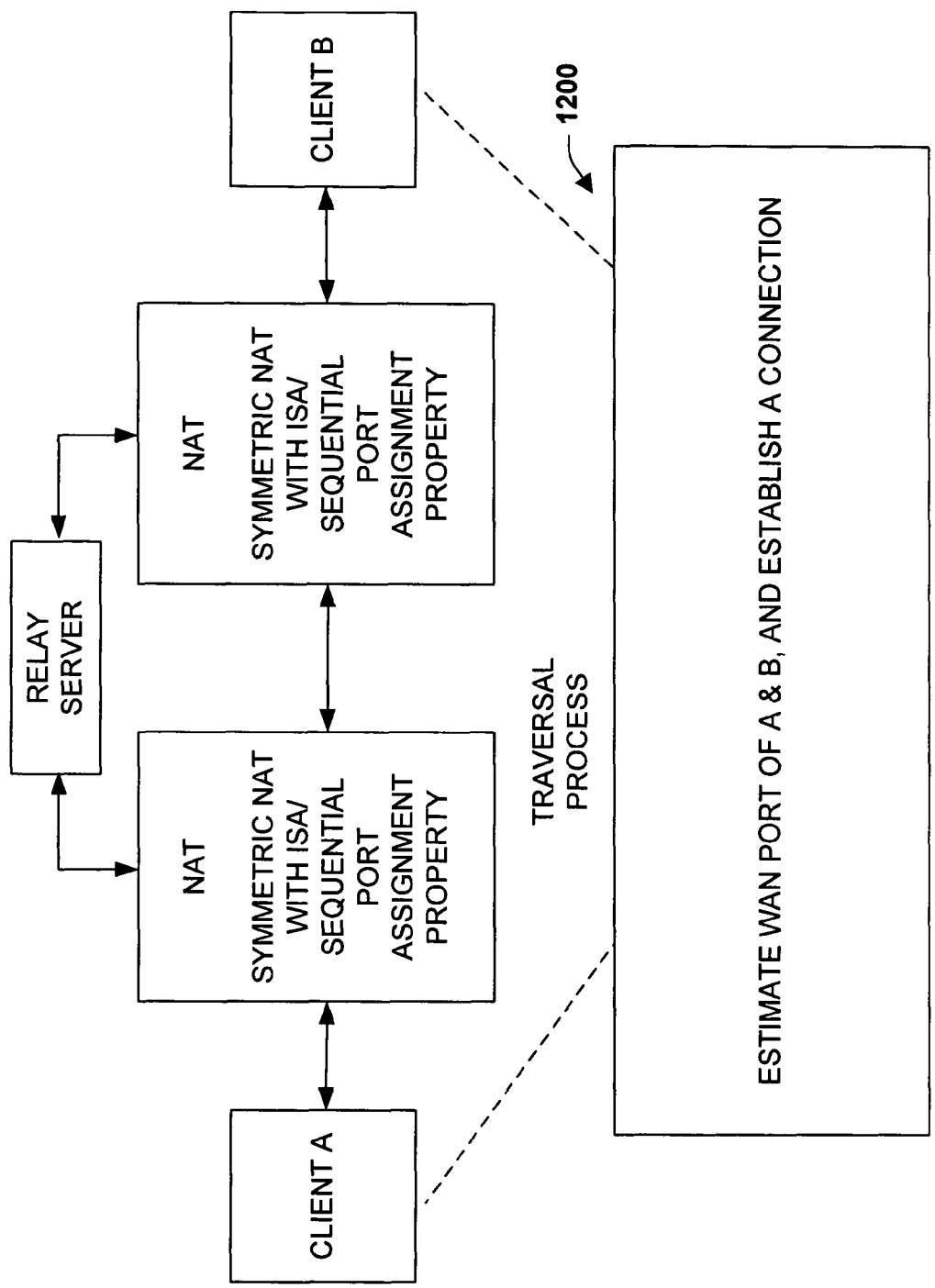

Referring to FIG. 12, a process 1200 applies when both the clients A and B are connected to a Symmetric NAT with ISA/deterministic port assignment property. In this case, both A and B are behind symmetric NAT, thus their WAN port changes when they connect to a different port. However, because of their ISA/deterministic property, their WAN port can be deduced to certain degree, and thus it becomes possible to establish a direct connection between the client A and B.

Figure 13:
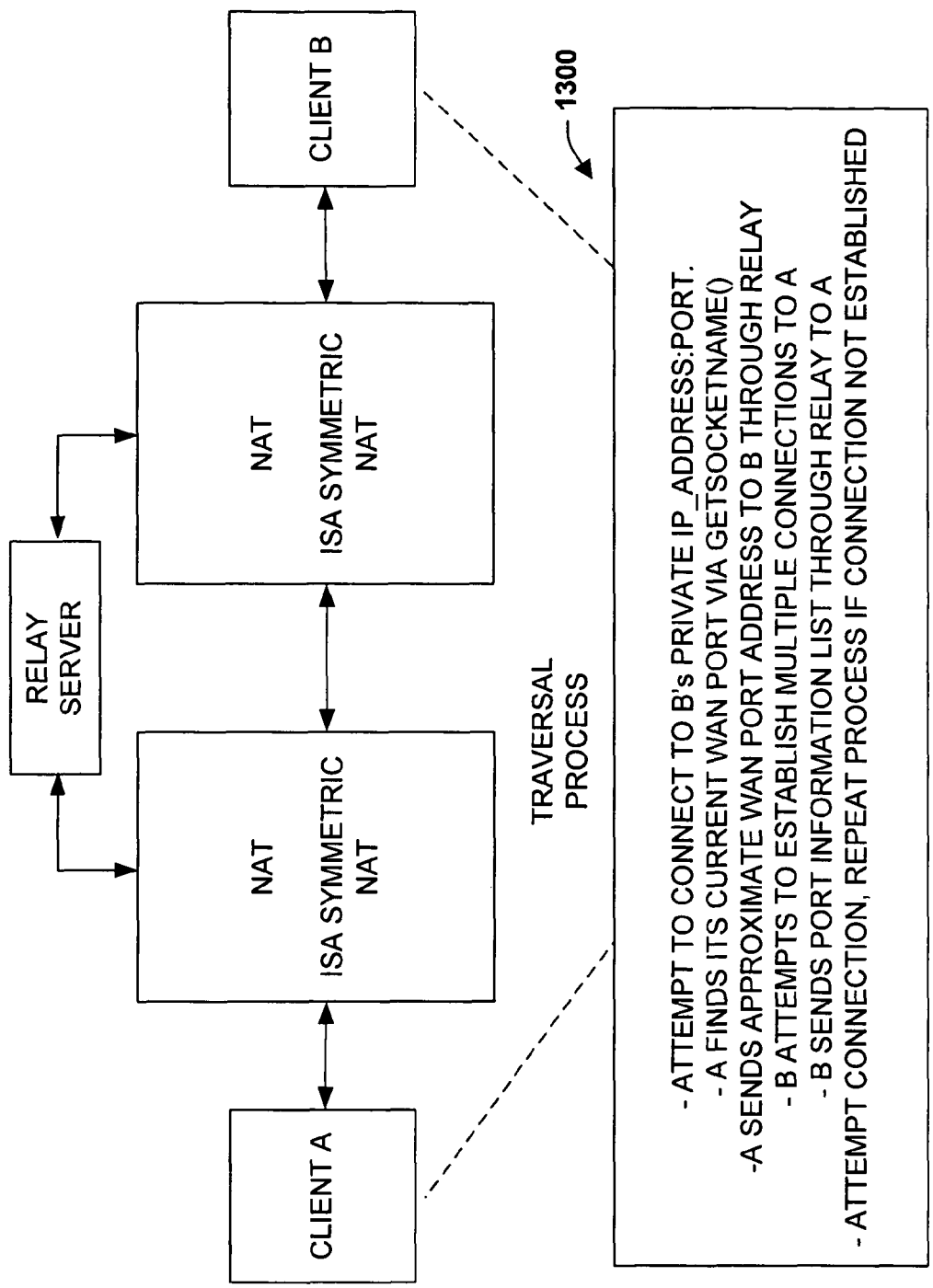

FIG. 13 depicts a process 1300 where both the clients A and B are connected to an ISA Symmetric NAT. In this case, A->B, and B->A are the same. Assuming that the client A wants to connect to the client B, the client A first connects to A's relay server, and using the getsockname( ) function call, it gets its current WAN port e.g., IP_A:23491. Through the relay server, A sends this approximate WAN port (IP_A: 23491) to B. Because A is a symmetric NAT, when A connects to B at a later instance, the WAN port of the client A is changed to a new number. Because the ISA NAT also has the sequential port assignment property. It is expected that A's WAN port at that time will be a value slightly larger than the WAN port sent to B. Therefore, B initiates multiple connections to A's potential future WAN ports, and uses the fact that B is an ISA NAT, and B uses the getsockname( ) function call to retrieve its port information. As an example, B may attempt multiple connections to A's potential future WAN ports as follows:

IP_B: 12452-IP_A:23500
IP_B: 12453-IP_A:23510
IP_B: 12454-IP_A:23520

It is noted regarding the gaps between IP_A's port, this allows time for the information to be sent to the client B. The process 1300 then has B send the port information list through A's relay server to A. Now, A has B's specific WAN port information. At first, A tries the first port in the port information list, in the example, A will try to connect to IP_B: 12452, use getsockname( ), A gets its current WAN port. This is checked with the desired WAN port IP_A:23500 in the port information list.

If the WAN port is smaller than IP_A:23500, A can establish another connection to IP_B:12452, and recheck the WAN port.

If the WAN port is equal to IP_A:23500, connection is established, the process 1300 completes.

If the returned WAN port is larger than IP_A:23500, A checks if the returned WAN port is larger than IP_A:23510. If the returned WAN port is smaller, A attempts the next WAN port in the port information list. In the example, A connects to IP_B:12453, uses getsockname( ), and A checks again.

If failed, A checks if the returned WAN port is larger than IP_A:23520. If not, A connects to IP_B: 12454, uses getsockname( ), and A determines if the WAN port is IP_A:23520. If succeeded, the connection is established. Otherwise, the process 1300 can be repeated.

If the ports in the port information list have been tried, A initiates multiple connections to B's potential future WAN ports, (e.g., IP_B: 12460, IP_B: 12470, IP_B: 12480), and compiles another list of port information. Client A then sends this list through B's relay to the client B, and now, it is B's turn to try to connect to A via the port information list. This process continues until the connection is established, or until sufficient attempts has been made and the attempt to establish a direct connection is deemed a failure.

Figure 14:
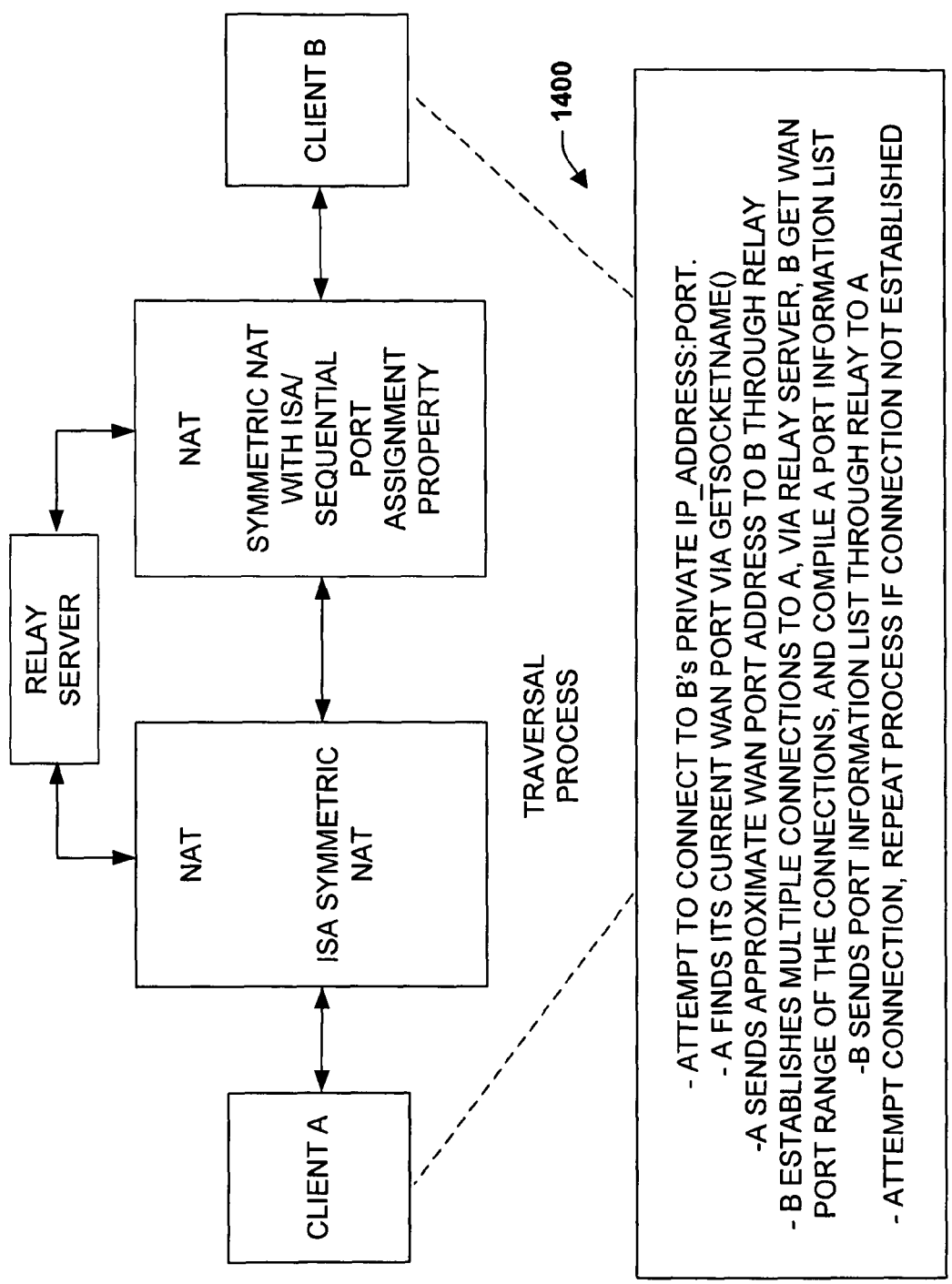

Turning to FIG. 14, a process 1400 shows the client A connecting to an ISA Symmetric NAT and the client B connecting to a Symmetric NAT with deterministic port assignment property. For B->A, B sends an invitation through relay to the client A, and the process becomes A->B. For A->B, the client A will first connect to A's relay server, and using the getsockname( ) function call, it gets its current WAN port, e.g., IP_A:23491. Through relay, A sends the approx WAN port (IP-A:23491) to B. Now B still attempts to establish multiple connections with A's potential WAN port, however, for each connection attempt, B uses the port discovery protocol to get an estimate of B's WAN port.

For example, assume B attempts to initiate n connections to A's potential WAN port. The client B initiates 2n+1 connections in quick session via either TCP/UDP protocol (determined by whether UDP direct connection or TCP direct connection is desired). The 1, 3, 5, 7, ..., 2n+1 connections are directed towards B's relay server, the 2, 4, 6, 8, ..., 2n connections are directed towards A's potential WAN_IP:port. For each connection, the client B generates a new random private IP_address:port for the connection. In the connections 1, 3, ..., 2n+1, since the client B is connected to a known reachable relay server, the relay server reports back to the client B the observed WAN_IP:port of the connections. B may then compile a port information list. As an example, assume that B attempts to connect to A's future WAN ports IP_A:23500, IP_A:23510, IP_A:23520, B attempts a total of 7 connections. Note the gap between IP_A's port, this allows time for the relay message and retry. Further assume that the WAN ports returned in the $1^{st}$, $3^{rd}$, $5^{th}$ and $7^{th}$ connections are: IP_B:12451, IP_B:12454, IP_B:12456, IP_B:12459. The port information list compiled by the client B becomes:

(IP_B:12452-12453)-IP_A:23500
(IP_B: 12455)-IP_A:23510
(IP_B: 12457-IP_B: 12458)-IP_A:23520

As an optional verification step, the client B may examine the WAN_IP:ports returned by the relay server for the two consecutive connections, and see if they comply with the assumption that the client B is connected to a Symmetric NAT with deterministic port assignment property. For symmetric NAT with sequential port assignment property, this examines the gap between the WAN ports of the two consecutive connections. If the gap is small, the sequential port assignment property holds. If the gap is large, there may be interfering traffic conditions during the consecutive connections, and B's WAN port becomes difficult to deduce for the client A, and thus may be dropped from the list. Client B then sends this compiled port information list through A's relay server to the client A. Upon receiving the port information list from B, A tries to connect to B's WAN_IP:ports. Client A again first tries the first port range in the port information list. Since there are multiple ports in a port range, A can try one port at a time. The specific port to be tried can be selected in a round-robin manner, or randomly selected. In the example, there are two ports IP_B: 12452 and IP_B: 12453 in the first entry. A will try to connect to one random port, say IP_B:12453. Then, using the property that A is behind an ISA NAT, A uses getsockname( ) function call, and gets its current WAN port. This is checked with the desired WAN port IP_A:23500 in the port information list.

If the WAN port is smaller than IP_A:23500, A establishes another connection to another port in the port range of the first entry of the port information list, and rechecks the WAN port.

If the WAN port is equal to IP_A:23500, A checks if the connection goes through. In this example, since there are two possible WAN ports for the client B, there is a 50% chance that the connection succeeds.

If the returned WAN port is larger than IP_A:23500, A checks if the returned WAN port is larger than IP_A:23510. If the returned WAN port is smaller, A attempts the next WAN port range in the port information list. In the example, A connects to (IP_B: 12455), and A checks again.

If failed, A checks if the returned WAN port is larger than IP_A:23520. If not, A connects to one of the ports in the WAN port range of the third entry, i.e.,(IP_B:12457-IP_B:12458), uses getsockname( ), and A checks if the WAN port is IP_A: 23520.

If the ports in the port information list has been tried, A sends a relay through B's relay server, so that B may initiate another set of connections and sends A another port information list. The above process repeats, until either the connection is established, or a sufficient attempts have been made and it is considered a failure to establish connections to traverse the NATs between the clients A and B.

Figure 15:
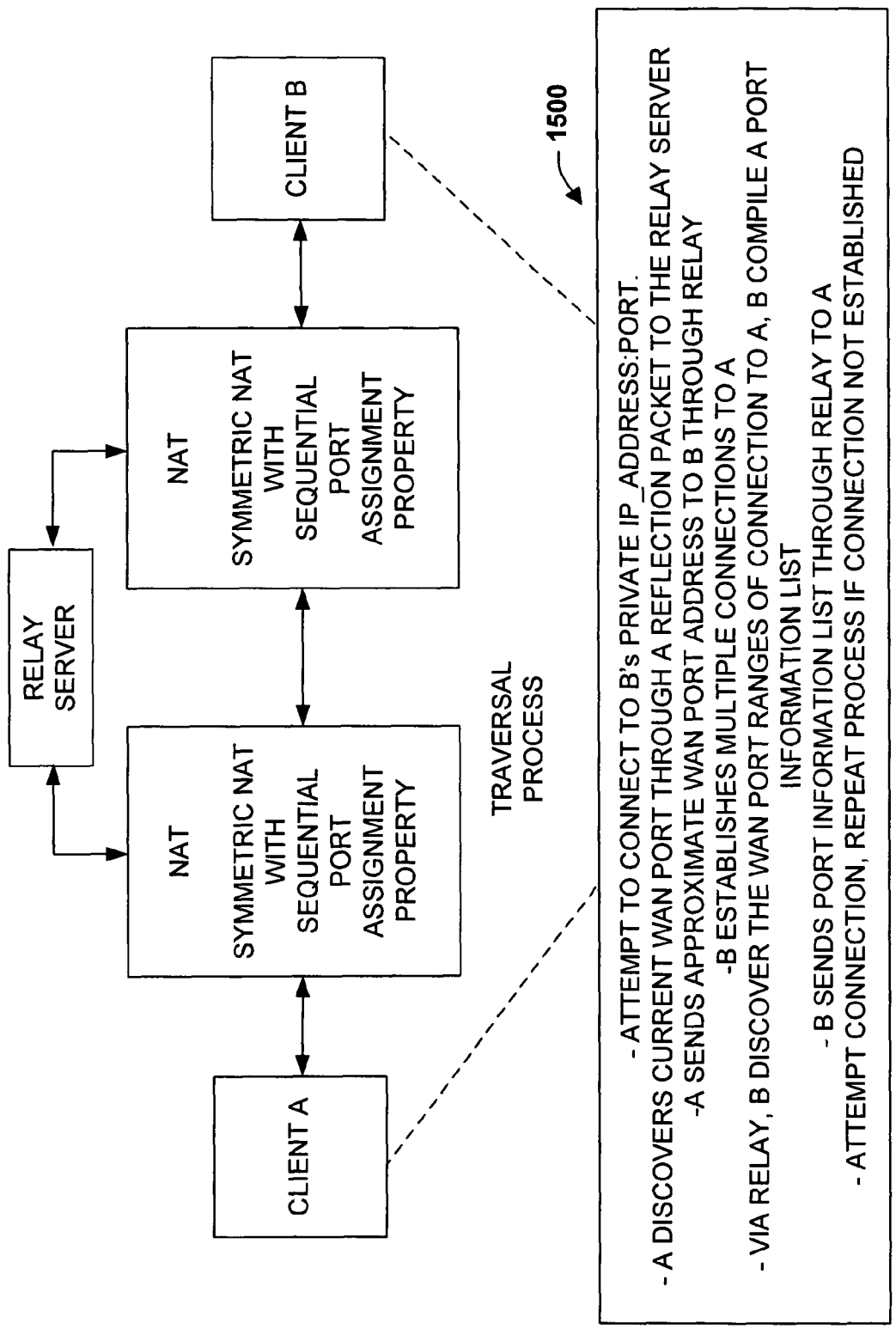

FIG. 15 illustrates a process 1500 where the clients A and B are connected to a Symmetric NAT with deterministic port assignment property. In this example, A->B and B->A are the same. At first, the client A will connect to A's relay server, and using the getsockname( ) function call, it gets its current WAN port, e.g., IP_A:23491. Through the relay, A sends the approx WAN port (IP_A:23491) to B. Similar to the process 1400, B attempts to establish multiple connections with A's potential WAN port, and compile a port information list. Assume that the initial port information list compiled by the client B is:

(IP_B: 12452-12453)-IP_A:23500
(IP_B: 12455)-IP A:23510
(IP-B: 12457-IP_B: 12458)-IP_A:23520 which is the same as the list in the example of process 1400. B sends the port information list through A's relay server. Upon receiving the portion information list from B, A tries to connect to B's WAN_IP:ports.

Similar to the process 1400, A first tries the first port range in the port information list. Since there are multiple ports in a port range, A can try one port at a time. The specific port to be tried each time can be selected in a round-robin manner, or randomly selected. Assume that A gives a total of m tries, e.g., IP_B: 12452-IP_A:try_port_1
IP_B:12453-IP_A:try_port_2
. . .
IP_B: 12453-IP_A:try_port_m At the end, A also initiates a relay connection to A's relay server to obtain the current WAN port of the client A. If the WAN port is smaller than IP_A:23500, A will continue to try the port range of the first entry of B's port information list.

If the WAN port is equal to or greater than IP_A:23500, the effort to connect to the client B fails in the first entry of the port information list. Client A moves on to the second entry.

If the WAN port is equal than IP_A:23500, A checks if any one of the connection goes through. If one of the connections goes through, A succeeds in the NAT traversal. Otherwise, A checks if the returned WAN port is larger than IP_A:23510.

If the returned WAN port is smaller, A attempts the second entry in the port information list. If the returned WAN port is larger, the third entry in the port information list is attempted.

If the entries in the port information list has been tried, A can attempt to connect to B's potential WAN port, and compile a port information list. This port information list is then sent to the client B through B's relay B. Then B may try to connect to A via A's port information list.

Figure 16:
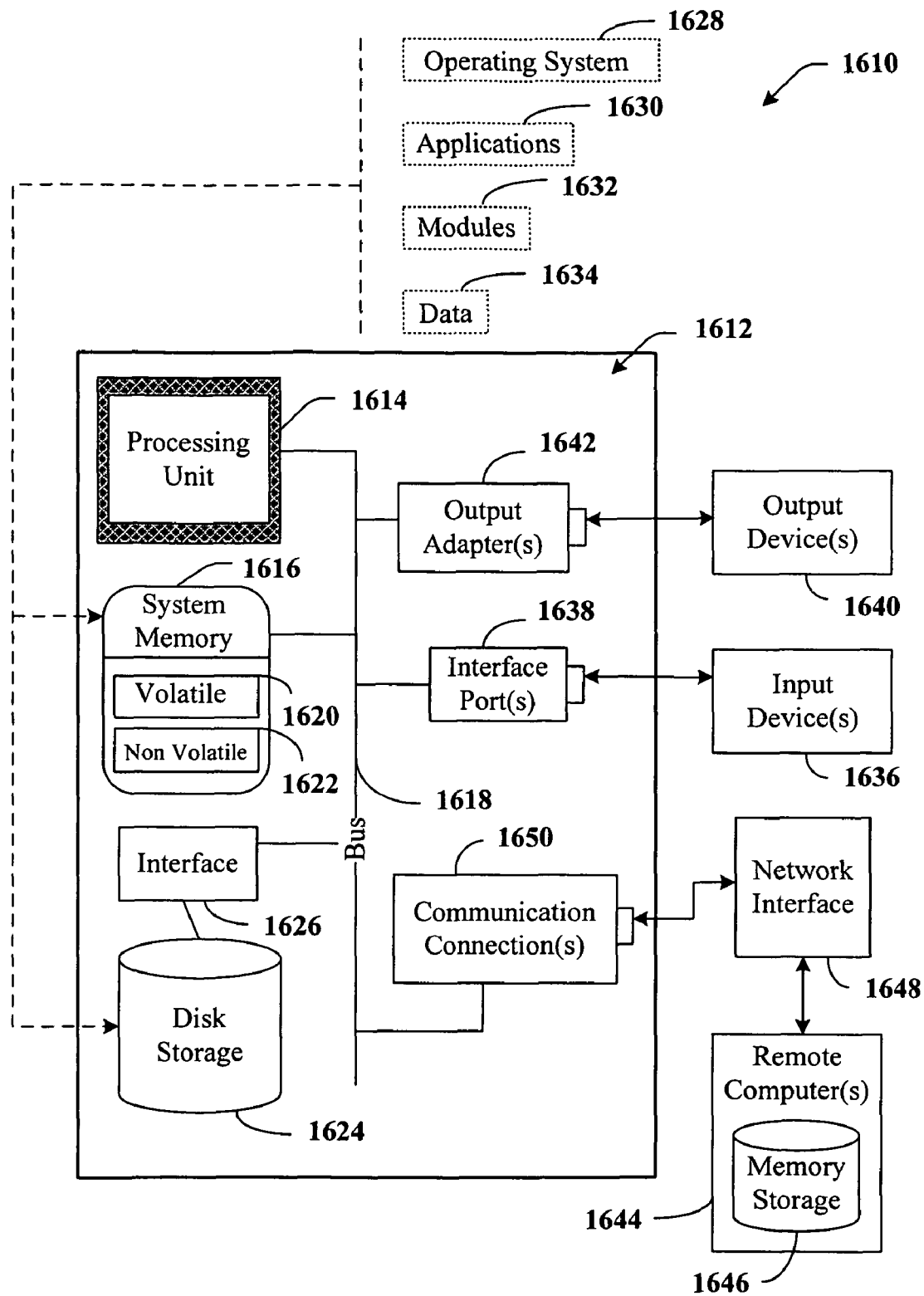
FIG. 16 is a schematic block diagram illustrating a suitable operating environment in accordance with an aspect of the subject invention.

With reference to FIG. 16, an exemplary environment 1610 for implementing various aspects of the invention includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the subject invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapter 1642 is provided to illustrate that there are some output devices 1640 like monitors, speakers, and printers, among other output devices 1640, that require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

Figure 17:
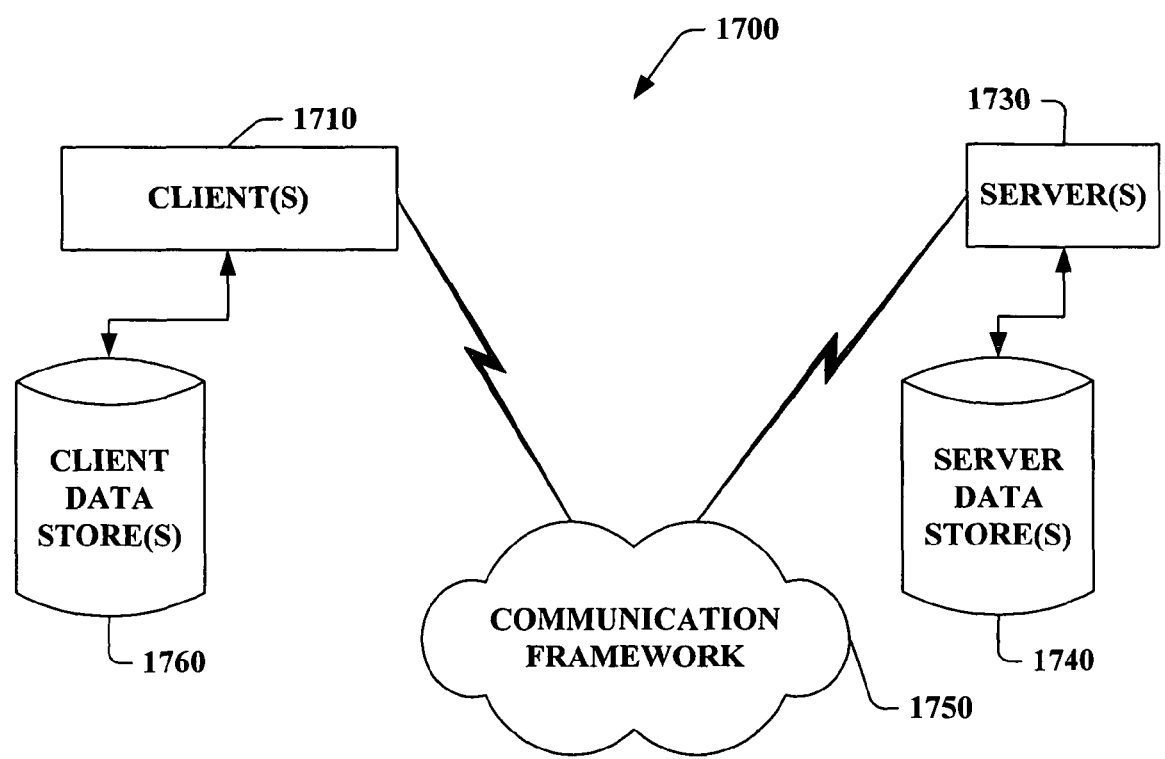
FIG. 17 is a schematic block diagram of a sample-computing environment with which the subject invention can interact.

FIG. 17 is a schematic block diagram of a sample-computing environment 1700 with which the subject invention can interact. The system 1700 includes one or more client(s) 1710. The client(s) 1710 can be hardware and/or software (e.g., threads, processes, computing devices). The system 1700 also includes one or more server(s) 1730. The server(s) 1730 can also be hardware and/or software (e.g., threads, processes, computing devices). The servers 1730 can house threads to perform transformations by employing the subject invention, for example. One possible communication between a client 1710 and a server 1730 may be in the form of a data packet adapted to be transmitted between two or more computer processes. The system 1700 includes a communication framework 1750 that can be employed to facilitate communications between the client(s) 1710 and the server(s) 1730. The client(s) 1710 are operably connected to one or more client data store(s) 1760 that can be employed to store information local to the client(s) 1710. Similarly, the server(s) 1730 are operably connected to one or more server data store(s) 1740 that can be employed to store information local to the servers 1730.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer storage medium, the computer storage medium being hardware, having stored thereon instructions that when executed by a processor perform a process, the process comprising:

automatically selecting a protocol that facilitates communications between a first peer and a second peer, a first Network Address Translator (NAT) being communicatively between the first peer and the second peer in a network, the network including a second NAT communicatively between the first NAT and the second peer, wherein, when the first NAT is of the type directed Internet connection without NAT functionality, UPnP NAT, or first Full Cone NAT and the second NAT is of the type directed Internet connection without NAT functionality, UPnP NAT, or Full Cone NAT, a first protocol is selected, when the first NAT is of the type Restricted Cone NAT and the second NAT is of the type Restricted Cone NAT, a second protocol is selected, when the first NAT is of the type Restricted Cone NAT, Symmetric NAT with ISA functionality, Symmetric NAT with deterministic port assignment, or Symmetric NAT without ISA functionality and without deterministic port assignment and the second NAT is of the type directed Internet connection without NAT functionality, UPnP NAT, or Full Cone NAT, a third protocol is selected, when the first NAT is of the type Firewall with egress traffic filtering and the second NAT is of the type directed Internet connection without NAT functionality or UPnP NAT, a fourth protocol is selected, when the first NAT is of the type Restricted Cone NAT and the second NAT is of the type symmetric NAT with ISA functionality, a fifth protocol is selected, when the first NAT is of the type Restricted Cone NAT and the second NAT is of the type symmetric NAT with deterministic port assignment, a sixth protocol is selected, when the first NAT is of the type symmetric NAT with ISA functionality and the second NAT is of the type symmetric NAT with ISA functionality, a seventh protocol is selected, when the first NAT is of the type symmetric NAT with ISA functionality and the second NAT is of the type symmetric NAT with deterministic port assignment, an eighth protocol is selected, when the first NAT is of the type symmetric NAT with deterministic port assignment and the second NAT is of the type symmetric NAT with deterministic port assignment, a ninth protocol is selected, and when the first NAT is of the type Firewall with egress traffic filtering and the second NAT is of the type Full Cone NAT, Restricted Cone NAT, symmetric NAT with ISA functionality, symmetric NAT with deterministic port assignment, symmetric NAT without ISA functionality and without deterministic port assignment, or Firewall with egress traffic filtering, or the first NAT is of the type symmetric NAT without ISA functionality and without deterministic port assignment and the second NAT is of the type Restricted Cone NAT, symmetric NAT with ISA functionality, symmetric NAT with deterministic port assignment, or symmetric NAT without ISA functionality and without deterministic port assignment, a tenth protocol is selected; and facilitating communications between the first peer and the second peer using the selected protocol, wherein the first protocol, second protocol, third protocol, fourth protocol, fifth protocol, sixth protocol, seventh protocol, eighth protocol, and ninth protocol are each different from each other and each facilitate direct communications between the first peer and the second peer.

2. The computer storage medium of claim 1, wherein the tenth protocol relies upon a relay server for all communications between the first peer and the second peer.

* * * * *